Nov. 8, 1955 H. M. PORTER ET AL 2,722,785
LENS POLISHING APPARATUS
Filed March 9, 1953 4 Sheets-Sheet 1

INVENTORS
Harold M. Porter and
Patrick H. Reardon
BY Melvin W. Sandmeyer
ATTORNEY Nov. 8, 1955  H. M. PORTER ET AL  2,722,785
LENS POLISHING APPARATUS Filed March 9, 1953  4 Sheets-Sheet 2

INVENTORS
Harold M. Porter and
Patrick H. Reardon

BY Melvin W. Sandmeyer
ATTORNEY

Nov. 8, 1955  H. M. PORTER ET AL  2,722,785
LENS POLISHING APPARATUS
Filed March 9, 1953  4 Sheets-Sheet 3

INVENTORS
Harold M. Porter and
Patrick H. Reardon

BY Melvin W. Sandmeyer
ATTORNEY

INVENTORS
Harold M. Porter and
Patrick H. Reardon
BY Melvin W. Sandmeyer
ATTORNEY 2,722,785
Patented Nov. 8, 1955

2,722,785

LENS POLISHING APPARATUS

Harold M. Porter and Patrick H. Reardon, Hagerstown, Md., assignors to The Mitchell-Tyler Company, Hagerstown, Md., a corporation of Maryland Application March 9, 1953, Serial No. 341,108

4 Claims. (Cl. 51—131)

This invention relates to the polishing of lenses and is a continuation-in-part of application Serial No. 230,883, filed June 11, 1951, now Patent No. 2,686,391.

In the cited prior application there is shown and described an arrangement for the simultaneous polishing of a large number of blocker mounted lenses and, since the filing of that application, the apparatus has been improved in several respects to render the operating area more accessible, to render the apparatus more readily adjustable to blockers of different sizes and to improve the wearing qualities of the apparatus.

These and other objects of the present invention will be apparent upon consideration of the following detailed description of several embodiments thereof in conjunction with the annexed drawing wherein.

When lenses are ground according to the procedures of application Serial No. 230,883, filed June 11, 1951, now Patent No. 2,686,391, a number of cylindrical lens blanks are cemented into symmetrically arranged cavities in a blocker and are thereafter subjected to the action of a coarse grinding composition for about 5½ hours until the lens blanks are plano-convex with their curved surfaces flush with and corresponding to a portion of the spherical surface of the blocker in which they are mounted.

Figure 10:
Figure 10 is a view in elevation of a blocker of the type used in the machine of Figures 1 to 4 inclusive.
Figure 11:
Figure 11 is a view in elevation of a larger blocker of the type used in the machine of Figures 5 to 9 inclusive.

When the lenses have completed the first 5½-hour schedule, they are ground to shape but are not polished, and they then require to be subjected to a polishing action for about 1½ hours in the presence of a water lubricated polishing compound such as rouge of 2 or 3 microns. This final polishing is accomplished in the apparatus of Figures 1, 2, 3 and 4. In this instance the balls are individually held in a rack 10 which is a disc of rubber or other plastic material having a thickness somewhat less than the diameter of the blockers or balls. The rack 10 is provided with circumferentially spaced holes arranged in two coaxial groups, each hole being of a diameter greater than that of the blocker ball with its lenses, the blockers by this time having the general contour illustrated in Figure 10. At the center of the rack 10 there is a hole 11 in which there is accommodated a pin 12 which is eccentrically mounted to extend axially from a hub 13 connected to a shaft 14 which passes through a bearing 15 and is provided with a driving sheave 16 which is connected by a belt 17 to a sheave 18 driven from a driving motor 19.

Below the rack 10 there is mounted a driving plate 20 having a trough-like periphery 21 and a centrally-disposed sponge rubber backed felt pad 22. The driving plate 20 is connected to a shaft 23 which passes through bearings 24 in a plate 25 and bearings 26 in plate 27. Below the bearing 26 a sheave 28 is attached to the shaft 23 and this sheave is connected by a belt 29 to a pulley 30 indirectly connected to a motor 31.

A scoop 32 is mounted in cooperating relation with the trough 21 and the scoop is connected by a conduit 33 to return grinding compound to the center of the apparatus. The conduit 33 is mounted on a plate 34 which is supported by four standards 35 from a hinged sheet 36 on which the bearing 15 is mounted. To the lower side of plate 34 is cemented a sponge rubber backed felt pad 37. The hinged sheet 36 or upper table is connected to a stationary sheet 38 in the same plane and that sheet is connected by four adjustable spacers 39 to the sheet 25 therebelow. The sheet 25 constitutes the lower table and is supported in spaced relation from the floor by standards 40 which also support sheet 27 and the motor 31 mounted thereon.

Operation of the device of Figures 1 to 4, inclusive, is begun by swinging the plate 36 counter-clockwise about the hinges at 41. This removes the shaft 14 and its associated hub 13 and the pin 12 to a position above and completely out of the way of the upper face of the driving plate 20. An appropriate number of blockers are inserted in the rack 10 and the rack is placed in position on the felt pad 22 and a fairly large amount of water lubricated, fairly free-flowing, polishing compound is poured into the plate 20. Thereafter the plate 36 is returned to the Figure 4 position and latched by the latch 42. The blockers are thus held properly spaced in the rack and sandwiched between the sponge rubber backed felt pad 22 on driving plate 20 and the upper stationary sponge rubber backed felt pad 37 mounted on stationary plate 34. The tension or squeeze on the blockers between the two felt covered pads is then regulated by the four spacers 39 which may be adjusted as to effective length by any of the many means known to those skilled in the art. Motors 19 and 31 are then started.

Motor 19 is connected through a gear box 43 to the pulley 16 and motor 31 is connected through a gear box 44 to the pulley 28. The gearing arrangements are such and the relation of the diameters of the pulleys are such that shaft 23 is driven at about 130 R. P. M. whereas shaft 14 is driven at about 8 R. P. M. The polishing action is obtained by the friction generated against the blockers held between the driving plate pad and the stationary plate pad. The pin 12 in the hole 11 causes the rack to be oscillated slowly relative to the driving plate 20 and the stationary plate 34 so that the polishing of the balls is evenly accomplished due to continuous change in their axis of rotation. The grinding compound which is thrown out by centrifugal force is recovered by the scoop 32 and returned through the center of the apparatus through the clearance hole at 45 in the plate 34 in which the hub 13 is located. After 1½ hours of polishing with rouge of 2 or 3 microns, the lens blanks are finished to a high polish and are characterized by high uniformity and excellent accuracy. The machine of Figures 1 to 4, inclusive, is then stopped, the blockers are washed and immersed in a solvent such as acetone so that the now-completed plano-convex lenses can be removed from the blocker spheres.

In the arrangement of Figures 5 to 9 inclusive, the basic polishing operations just described are carried out under somewhat improved conditions. In the first place, the vertical adjustment of the upper, stationary plate 46, which corresponds to the plate 34 of Figures 1 to 4 inclusive, is facilitated and, in the second place, the structure of the rack 47, corresponding to the rack 10 of Figures 1 to 4 inclusive, is considerably modified.

The basic structure of the polishers of Figures 5 to 9 inclusive involves, in addition to the upper stationary plate 46 and the rack 47, a lower rotating driving plate 48. The driving arrangements for the plate 48 are so similar to those employed in connection with the form of the invention shown in Figure 1 as not to require illustration in connection with the form of the invention shown in Figures 5 to 9 inclusive. It is to be understood, however, that the driving plate 48 is equipped with a driving shaft 49, journaled in a plate 50 which is supported from the floor by standards 51 corresponding in structure and function to the standards 40 of Figure 1.

Figure 1:
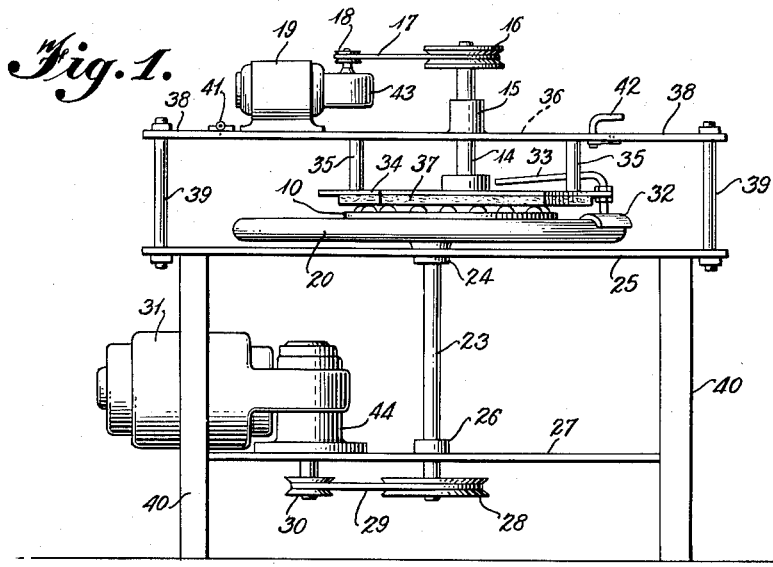
Figure 1 is a view in side elevation of apparatus according to the present invention which is particularly adapted for the final polishing operation to which the lenses are subjected.
Figure 2:
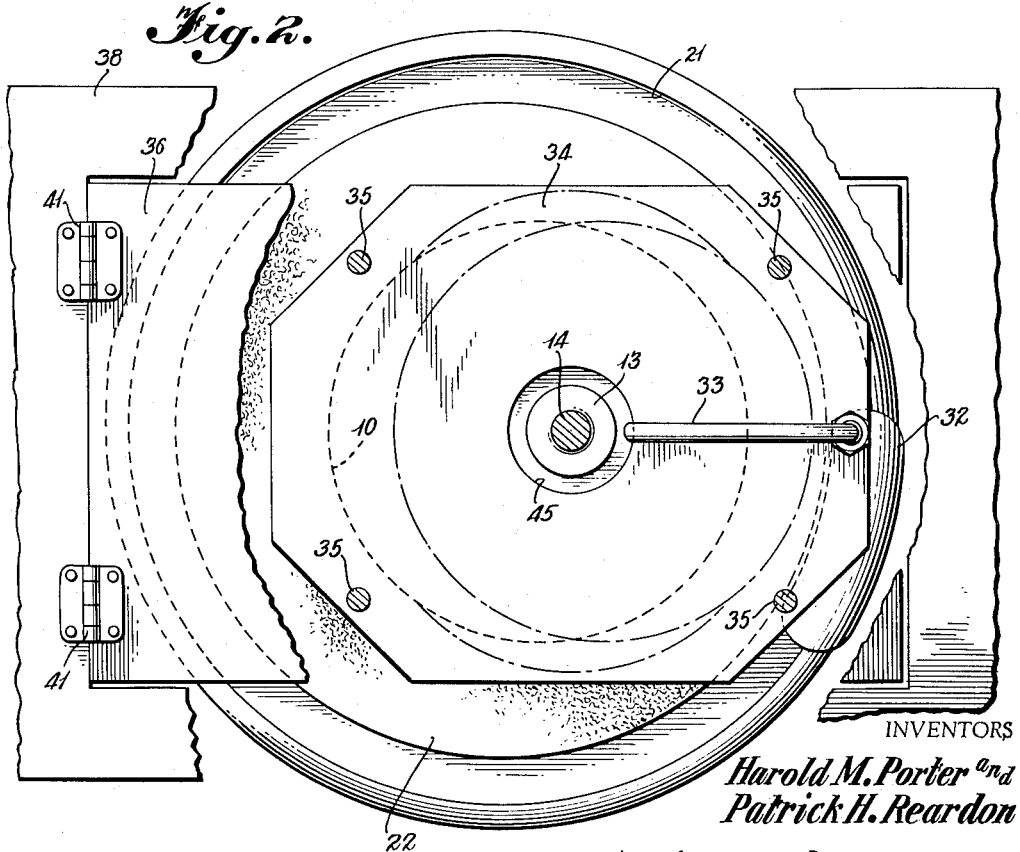
Figure 2 is a fragmentary top plan view of the apparatus of Figure 1 showing the relation of the driving plate to the bed in which the blockers are rotated and likewise illustrating apparatus for the circulation of the grinding compound.
Figure 3:
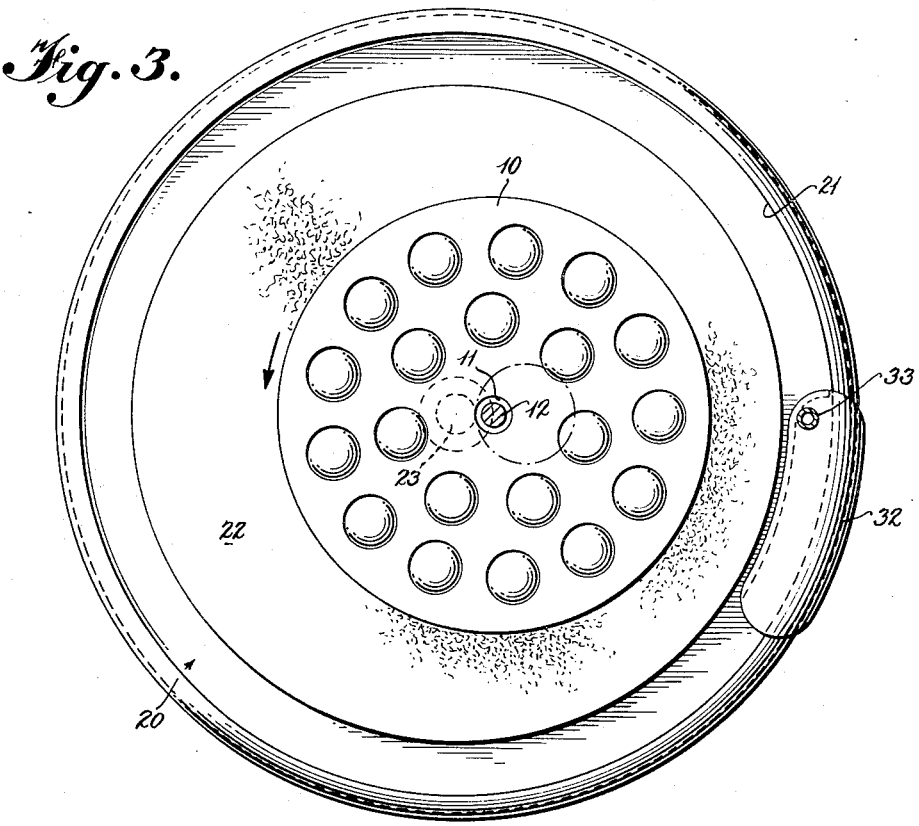
Figure 3 is a plan view taken at a plane below the plane of Figure 2 and showing a rack for the accommodation of the blockers during the polishing operation.
Figure 4:
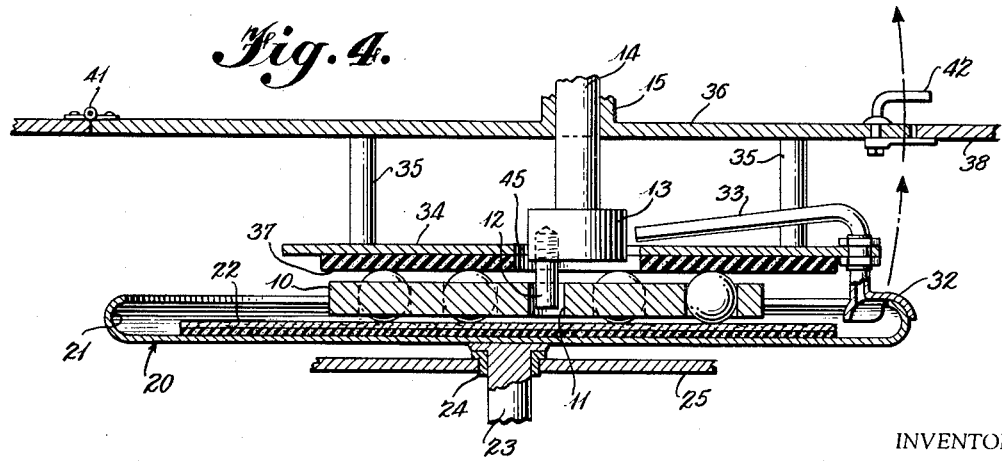
Figure 4 is a view in vertical section through the polishing apparatus of Figure 1.
Figure 5:
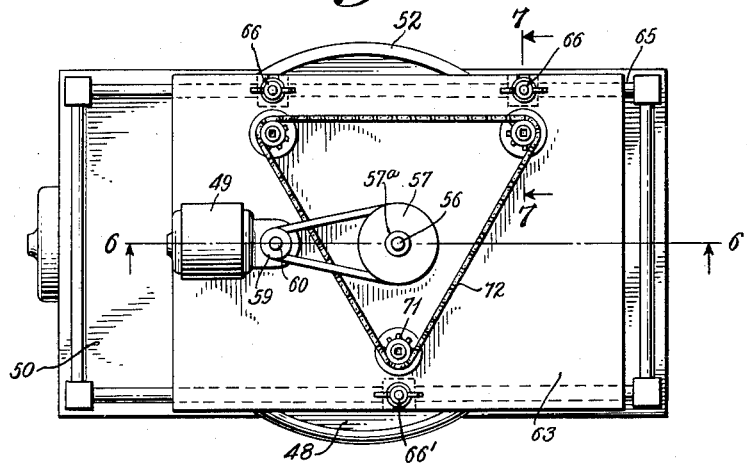
Figure 5 is a top plan view of modified polishing apparatus incorporating improved facilities for adjustment of blockers of different sizes.
Figure 6:
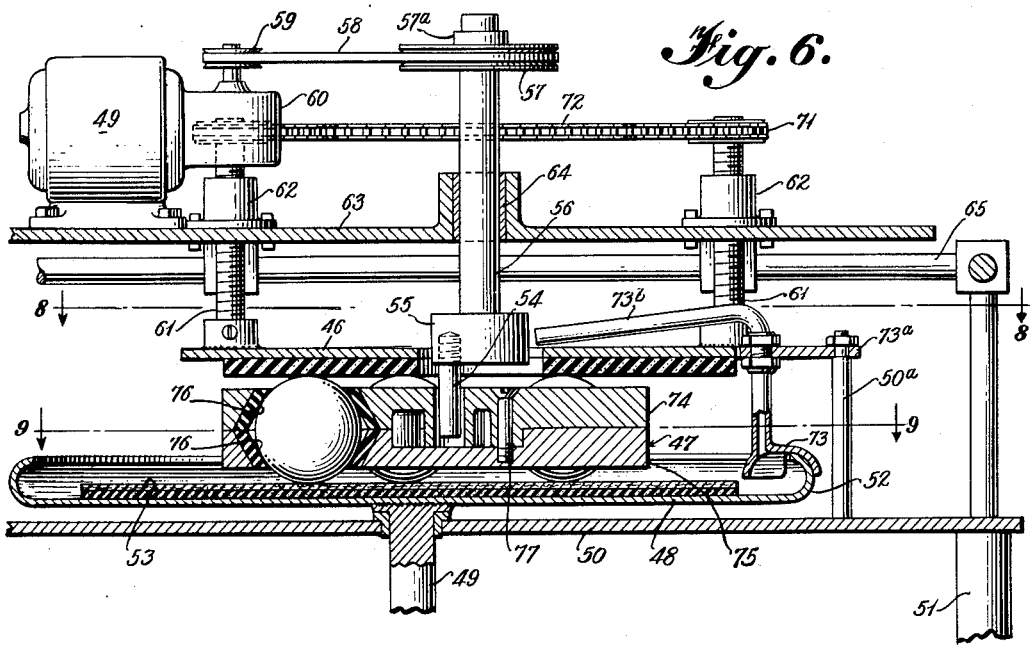
Figure 6 is a view in section taken on the line 6—6 of Figure 5.
Figure 7:
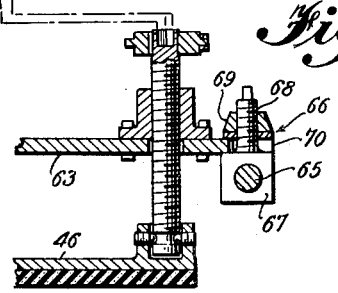
Figure 7 is a fragmentary view in section of the adjusting mechanism of the apparatus of Figure 5.
Figure 8:
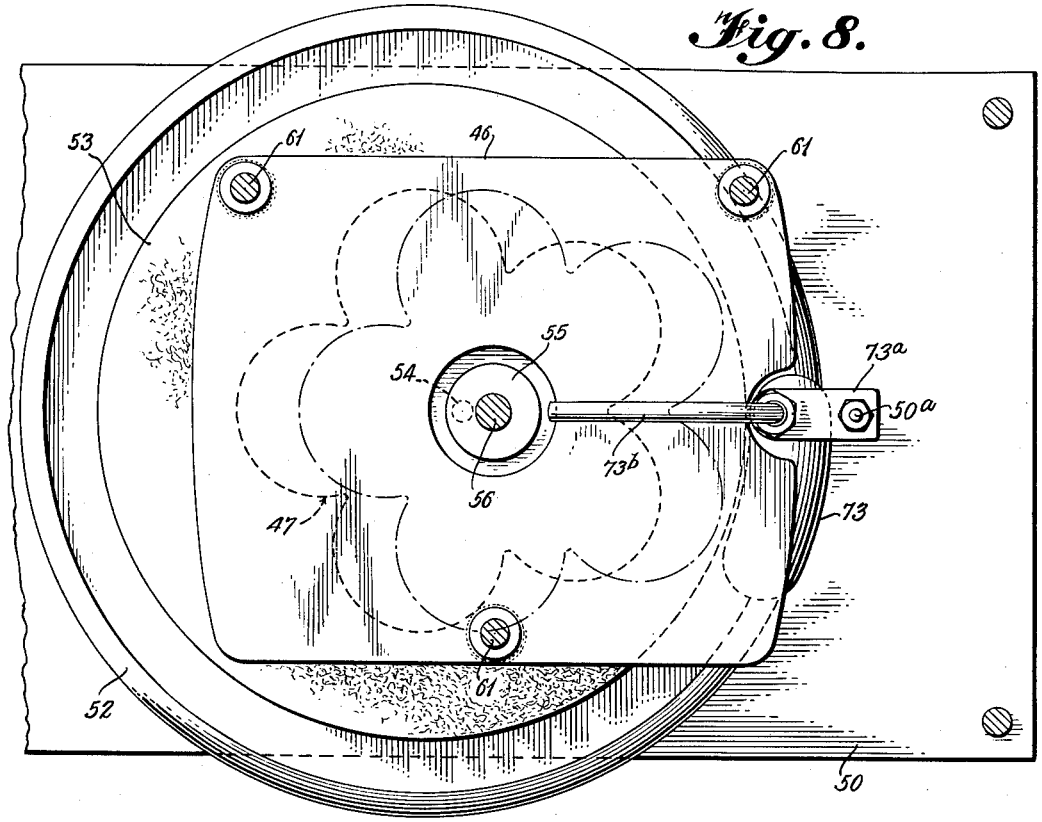
Figure 8 is a view partially in plan and partially in section taken on the line 8—8 of Figure 6.

The driving plate 48 is provided with a marginal trough 52 and with a centrally disposed pad 53 corresponding in structure and in function to the pad 22 of Figure 4.

The rack 47, which corresponds in function but not in structure to the rack 10 of Figure 4, is propelled by a pin 54 extending eccentrically from a hub 55 mounted on the end of a shaft 56 which has at its other end a sheave 57 connected by a V-belt 58 to a sheave 59 extending from a gear box 60 driven by motor 49. Thus, the structure and apparatus for bringing about the movement of the rack 47 is practically identical to the structure for bringing about like movement of the rack 10. On the other hand, the arrangement for positioning the stationary plate 46 in a vertical sense relative to the driving plate 48 is quite different.

The plate 46 has mounted for rotation therein three vertically extending threaded studs 61. These three studs pass through threaded bosses 62 mounted in cover plate or table 63 which cover plate additionally provides a bearing 64 for the shaft 56. The cover plate or table 63 is removably held in position from a rectangular framework of rods 65 by three latching elements 66, one of which is shown in considerable detail in Figure 7. The latching element 66 comprises a square portion 67 fitting over a rod 65 and a small threaded boss 68 extending therefrom and adapted to coact with a wingnut 69. When the cover plate or upper table is to be latched into position, its notched out portions 70 are registered with the threaded bosses 68 and locked down by the wingnuts 69. To remove the cover plate or upper table 63 requires only loosening the wingnuts and pivoting the bosses about the axes of rods 65 to a position permitting the cover plate to be lifted. When it is desired to remove the rack 47 in order to charge it with a new batch of blockers, all that is necessary is to loosen one of the wingnuts and to pivot the plate 63 and everything carried by it about the other two latching elements 66. This is apparent in Figure 5 in which the particular latching element which is loosened to permit hinging of the plate 63 is designated 66 prime.

In the form of the invention shown in Figure 4, compression of the blockers during polishing involves adjustment of the plate 38 which, acting through rigid standards 35, adjusts the plate 34. In the form of the invention shown in Figure 6, the stationary plate 46 is carried by the threaded studs 61 which have, at their ends above the plate 63, sprocket wheels 71 interconnected by a chain 72. At least one of the studs 61 is provided with a wrench receiving socket at its upper end whereby it and the sprocket wheel mounted thereon may be rotated to adjust the vertical position of the plate 46. Inasmuch as the several sprockets 71 are interconnected with the chain 72, it is apparent that movement of one stud 61 will cause like movements of the other studs 61 which will raise and lower the plate 46 without alteration of its angular position parallel to the plate 48. Thus, to adjust the pressure on the blockers in the rack 47, it is only necessary to crank the plate 46 downwardly or upwardly as the case may be.

In order to compensate for the change in diameter of the blockers, sheave 57 is keyed to be slidable to a limited extent on the shaft 56. Thus, if the blockers are of large diameter and shaft 56 is slightly raised, sheave 57 will keep itself in the same plane as sheave 59. A collar 57a is attached to the shaft 56 to keep pulley 57 from falling off the open end of the shaft when the plate 63 is pivoted to lie in a vertical plane as when removing and installing the rack 47.

The scoop 73 is mounted from the plate 50 rather than from the plate 46. To this end a standard 50a supports a bracket 73a which in turn supports the scoop 73. The spout 73b of the scoop 73 may be flexible or pivoted so that it can be swung out of the way when plate 46 is moved up and down, see Figure 8. The function of the scoop 73 is, of course, to return the polishing compound through the annular space at the center of the plate 46.

Figure 9:
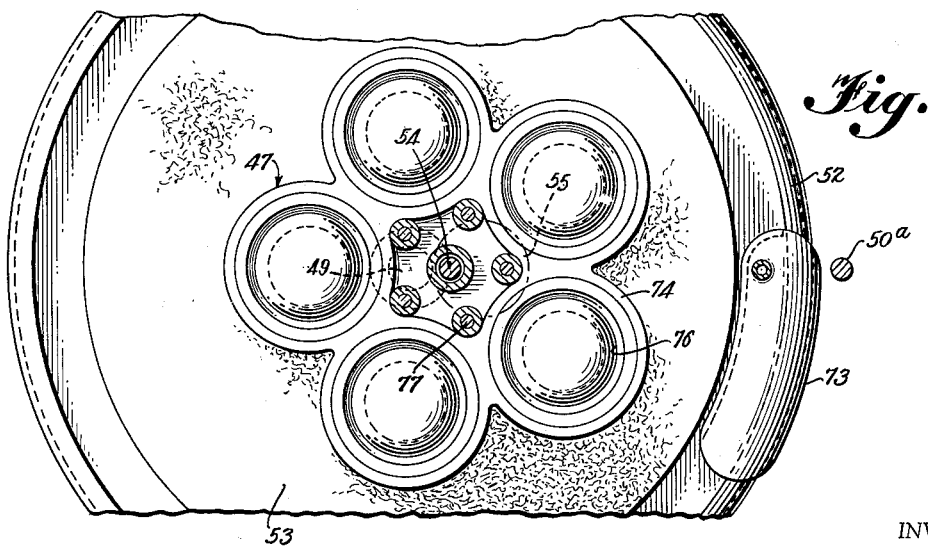
Figure 9 is a view partially in plan and partially in section taken on the line 9—9 of Figure 6.

It will be appreciated upon looking at the rack 10 that it would be exceedingly difficult to slip it out from underneath the plate 34 even if the pin 12 were not in position. This is due to the fact that there is nothing to hold the blockers in any particular position in the rack. The holes in the rack 10 are of a size slightly greater than the diameter of the blockers to be contained therein and this dimension is maintained from top to bottom, as indeed must be the case since the rack is charged by simply laying the blockers in position in the various holes. On the other hand, rack 47 is very differently charged because it is composed of an upper portion 74 and a lower portion 75. These portions are provided with frusto-conical cavities 76 which register base to base when the parts 74 and 75 are held together by their connecting screws 77, one of which shows in Figure 6 and all of which are shown in Figure 9. In view of the frusto-conical nature of the cavities 76 the rack 47 may be handled when it is fully charged with blockers without the slightest danger that the blockers will fall out, the diameter of the hole at the apex end of the cavity being less than the diameter of the blocker to be contained thereby. The cavities 76 are each lined with rubber and afford sufficient clearance so that the blocker can roll freely when subjected to the movements described in conjunction with Figures 1 to 4 inclusive.

What is claimed is:

1. Lens polishing apparatus comprising a driving disc, a rack including upper and lower portions each having tapered apertures therethrough, disconnectable means holding said portions with the wide portion of the apertures in mutual registry, means to rotate the driving disc, the center of said rack and the axis of rotation of the driving disc being mutually offset, and driving means acting on said rack to vary the magnitude of the offset of the rack relative to said disc.

2. Lens polishing apparatus comprising a driving disc, a rack including like upper and lower portions each having therein rubber inserts defining frusto-conical apertures therethrough arranged symmetrically about a central axis, means holding said portions with the bases of the apertures in mutual registry, means to rotate the driving disc, the center of said rack and the axis of rotation of the driving disc being mutually offset, and driving means acting on said rack to vary the magnitude of the offset of the rack relative to said disc.

3. Lens polishing apparatus comprising a driving disc, a plate overlying said disc, a table overlying said plate, screws mounted in said table and connected to said plate, means to drive said screws in unison to adjust vertically said plate relative to said disc, a rack between said disc and said plate, said rack having apertures therethrough for the reception of blockers, means to rotate said disc and means supported on said table and acting through said plate to move said rack eccentrically in a plane normal to the axis of rotation of said disc.

4. Lens polishing apparatus comprising an upper and a lower table, a framework for supporting the same, a driving disc supported above said lower table, a plate, screws engaging said upper table and suspending said plate therefrom in vertically adjustable overlying relationship to said disc, a rack between said disc and said plate, said rack having apertures therethrough for the reception of blockers, means acting through said lower table to rotate said disc, means supported on and acting through said upper table to move said rack eccentrically in a plane normal to the axis of rotation of said disc, and quick detachable means fastening said upper table to said framework.

References Cited in the file of this patent

UNITED STATES PATENTS

| | | |
|---|---|---|
| 604,594 | Woolf et al. | May 24, 1898 |
| 1,114,160 | Macbeth | Oct. 20, 1914 |
| 1,390,501 | Clarke | Sept. 13, 1921 |
| 1,486,345 | Hoke | Mar. 11, 1924 |
| 1,516,749 | Moore et al. | Nov. 25, 1924 |
| 1,588,435 | Adams | June 15, 1926 |
| 1,610,984 | Van Keuren | Dec. 14, 1926 |
| 1,870,328 | Indge | Aug. 9, 1932 |
| 1,893,955 | Maynard | Jan. 10, 1933 |
| 2,163,066 | Searcy | June 20, 1939 |
| 2,209,071 | Bullard | July 23, 1944 |
| 2,407,206 | Luboshez | Sept. 3, 1946 |
| 2,512,700 | Van Auken | June 27, 1950 |
| 2,565,590 | Bullard | Aug. 28, 1951 |